(12) United States Patent
García Laja

(10) Patent No.: US 7,604,200 B2
(45) Date of Patent: Oct. 20, 2009

(54) FITTING WITH TORSION BOX, OF PLASTIC MATERIAL REINFORCED WITH CARBON FIBRE, FOR COUPLING A DRIVE MOTOR / SPINDLE UNIT FOR TRIMMING OF A HORIZONTAL STABILISER OF AN AIRCRAFT

(75) Inventor: Agustín García Laja, Madrid (ES)

(73) Assignee: Airbus España, S.L., Getafe (Madrid) (ES)

( * ) Notice: Subject to any disclaimer, the term of this patent is extended or adjusted under 35 U.S.C. 154(b) by 314 days.

(21) Appl. No.: 11/727,363

(22) Filed: Mar. 26, 2007

(65) Prior Publication Data

US 2008/0001029 A1    Jan. 3, 2008

(30) Foreign Application Priority Data

Jun. 30, 2006    (ES) ................................. 200601822

(51) Int. Cl.
*B64C 1/26* (2006.01)
(52) U.S. Cl. .................... 244/99.3; 244/89; 244/131
(58) Field of Classification Search .................. 244/87, 244/88, 89, 39, 99.3, 99.8, 131, 123.1, 123.2, 244/123.4, 123.7, 54; 52/838, 841
See application file for complete search history.

(56) References Cited

U.S. PATENT DOCUMENTS 3,109,604 A * 11/1963 Brenner .................... 242/412.2
4,156,999 A * 6/1979 Avery ........................... 52/376
4,159,604 A * 7/1979 Burrell ......................... 52/376

FOREIGN PATENT DOCUMENTS

DE    102005003296    7/2006
DE    102005003297    7/2006

OTHER PUBLICATIONS

Spanish Search Report issued Feb. 19, 2008 in the counterpart Spanish Application No. 200601822.

* cited by examiner

*Primary Examiner*—Michael R Mansen
*Assistant Examiner*—Michael Kreiner
(74) *Attorney, Agent, or Firm*—Wenderoth, Lind & Ponack, L.L.P.

(57) ABSTRACT

Fitting with torsion box produced from a plastic material reinforced with carbon fiber, comprising a torsion box (2) with side walls and individual members for attaching the box to respective frames of the tail fuselage (1), along with a stiffening element (4) which joins the side walls (2a, 2b) and which comprises individual end parts (4a, 4b) and a central part (4c);
where
each end part (4a, 4b) comprises first sections (4d, 4e) which are extended parallel to the side walls (2a, 2b) to both sides of the central part (4c), second sections (4f, 4g) which are extended towards the corresponding side wall (2a, 2b) and third sections (4h, 4i) each one backing onto and attached to the side wall (2a, 2b);
the first sections (4e, 4d) of the end parts (4a, 4b) and the side walls (2a, 2b) of the torsion box include individual primary passage holes (5a, 5b, 5c, 5d) aligned in order to create the first fastening.

19 Claims, 5 Drawing Sheets

FITTING WITH TORSION BOX, OF PLASTIC MATERIAL REINFORCED WITH CARBON FIBRE, FOR COUPLING A DRIVE MOTOR / SPINDLE UNIT FOR TRIMMING OF A HORIZONTAL STABILISER OF AN AIRCRAFT

TECHNICAL FIELD OF THE INVENTION

This invention belongs to the technical field of aeronautical constructions, particularly to the sector of trimmable horizontal stabilizers of an aircraft, and more particularly to the fittings for the spindle used to vary the height of the fastening point of the horizontal stabilizer and thus permit trimming of the stabilizer.

STATE OF THE PRIOR ART OF THE INVENTION

The fastening of a trimmable horizontal stabilizer in an aircraft is usually carried out by means of coupling the stabilizer to one or two pivoting points and a fastening point. So that the plane of the horizontal stabilizer can trim the one or two fastening points it has to change its position vertically in order to permit the stabilizer to pivot on the pivot point or points. In order to allow this change of position, a motor/spindle is usually provided secured by a fitting. The rotation of the spindle in one direction or the other causes the fastening point to rise or fall. The fitting which secures that spindle is a metallic fitting which can be secured by a torsion box which is in turn secured by one or two master frames. The motor driving the spindle is anchored in the fitting while the spindle, which is connected to the motor via a swivel device, pivots with respect to the fitting in such a way that the sum of moments at the fastening point is zero and the load is virtually a pure vertical load. Typically, the metallic fitting usually presents a primary fastening and a secondary fastening in order to be able to comply with "fail-safe" requirements in such a way that if one of the fastenings fails, the other supports with the load without endangering the integrity of the aircraft. The primary fastening therefore has to resist the ultimate load while the secondary fastening only needs to withstand the limit load. The primary fastening is usually duplicated and has female lugs while the secondary fastening has male or female lugs.

In spite of trends in recent years to introduce the use of composites such as CFRP (Carbon Fibre Reinforced Plastic) in as many components of an aircraft as possible owing to the saving in weight implied by this material compared to aluminum, the majority of aircraft manufacturers are reluctant to use carbon fibre for manufacturing fittings on account of the complexity which they display, which makes their manufacture fairly expensive. This complexity is particularly pronounced in the case of the fitting for the motor/spindle unit due to the relatively large number of lugs which it has to have and the arrangement of them.

It was therefore desirable to have a fitting for a motor/spindle unit for trimming of a horizontal stabiliser of an aircraft that would overcome those drawbacks and which, therefore, could be manufactured in a composite such as CFRP, simply and economically.

DESCRIPTION OF THE INVENTION

The aim of the present invention is to overcome the difficulties of the fittings of the state of the art by means of a fitting for coupling a motor/spindle unit for trimming of a horizontal stabilizer of an aircraft which comprises a duplicated primary fastening for the coupling of a pivoting motor/spindle unit, and a secondary fastening, whose fitting comprises a torsion box with a first side wall and first means of attachment for attaching the first side wall to a first frame of the tail fuselage of the aircraft, and with a second side wall and second means of attachment for attaching the second side wall to a second frame of the tail fuselage. According to the invention, the side walls of the torsion box are attached together by means of a stiffening element arranged between said side walls. This stiffening element comprises a first end part attached to the first side wall, a second end part attached to the second side wall, and a central part which joins the end parts. Each end part comprises individual first sections which are extended parallel to the side walls to both sides of said central part, individual second sections which are respectively extended from one of the first sections to the corresponding side wall, and individual third sections each one backing onto and attached to the side wall, thus creating individual end parts with a transverse section in the form of an omega. The first sections of the first end part of the stiffening element and the first sections of the second end part of the stiffening element include individual first primary passage holes, while the side walls of the torsion box include individual second primary passage holes aligned with the primary passage holes in order to create the primary fastening. In turn, the second fastening consists of at least one secondary passage hole in the central part of the stiffening element. According to the invention, said sections of each end part of the stiffening element can comprise an additional laminated layer preferably made of the same material as the rest of the stiffener, in such a way that this laminated layer has a transverse section complementary to that of the sections creating the end part, in other words, that it also has the said omega configuration. The laminated layer can be formed by means of an additional stacking on top of the sections of the end parts of the stiffening element, in such a way that, although the laminated layer forms an additional part of the stiffening element, it creates a single piece with the latter.

In an embodiment of the invention, the first primary passage holes are arranged in individual reinforced zones of the first sections of the end parts of the stiffening element, and preferably in individual first primary lugs emerging from the respective edges of the first sections of the end parts of the stiffening element, while the second primary passage holes can be arranged in individual reinforced zones of the side walls of the torsion box, these reinforced zones being for example thickened zones or ones provided with a hybrid titanium-CFRP laminate, and preferably in individual second primary lugs emerging from the respective edges of the side walls of the torsion box. In turn, each secondary passage hole can be arranged in a reinforced zone of the central part of the stiffening element. When the end parts of the stiffening element include the said additional laminated layer, the first primary lugs emerge from the laminated layer in the respective edges of the first sections of the end parts of the stiffening element.

The third sections of the stiffening element can be attached to the respective side wall of the torsion box by means of gluing, or riveting, though the stiffening element and the torsion box can also be a monobloc piece.

The structure described above allows the torsion box and the stiffening element to be able to be shaped starting from a plastic material reinforced with carbon fiber, as well as permitting an optimum distribution of the loads acting on the fitting and the torsion box. So, the loads applied to the fitting are essentially loads in the vertical direction, though it can also be subjected to small longitudinal loads owing to the balancing of the horizontal stabilizer. The lateral load is virtually zero, which avoids problems of the third sections of the end parts of the stiffening element from becoming detached, which is something that could occur. These vertical loads on the primary fastening are applied in the primary passage holes, for example in the lugs located in the stiffening element, and in the side walls of the torsion box. These loads are transmitted to the walls of the torsion box and are then converted into shear flows in the cores of the closing frames.

The load applied to the first primary passage holes which are preferably located in the lugs is transmitted to the wall of the torsion box via attachments provided in the respective third sections of the end parts of the stiffening element. These attachments are preferably riveted attachments since the failure load of such riveted attachments can be known more accurately than when using glued pieces. These riveted attachment also have the advantage that the vertical loads of the secondary fastening are transferred to the walls of the torsion box via these riveted attachments without the flow of loads being transferred at any moment via glued attachments. Finally, loads in the longitudinal direction are transmitted to the walls of the torsion box without any kind of eccentricity via the passage holes, preferably located in the said lugs, situated in the walls of the torsion box.

In order to manufacture the fitting with torsion box of the present invention, techniques can be used that are conventional in themselves, which permit the pieces to be shaped and, which, if it is planned to carry out the attachment by riveting, permit them to be riveted together. So, the pieces can be obtained by means of processes in which, in the case of pieces manufactured separately and then riveted together so that the loads are transmitted via the riveted attachments, the pieces are manufactured in pre-peg with ATL and hot-formed, or in the case of pieces that are entirely integral they can be manufactured for example by means of Resin Transfer Molding® with attachments via the interfaces which only contain resin.

It can be seen that the fitting with torsion box of the present invention is easy and cheap to manufacture and is less heavy than metallic devices thanks to its greater integration and simplicity of the load path, thus achieving the object specified above.

BRIEF DESCRIPTION OF THE FIGURES

Described below are certain aspects of the invention on the basis of some drawings forming an integral part of this specification, and in which.

Figure 1:
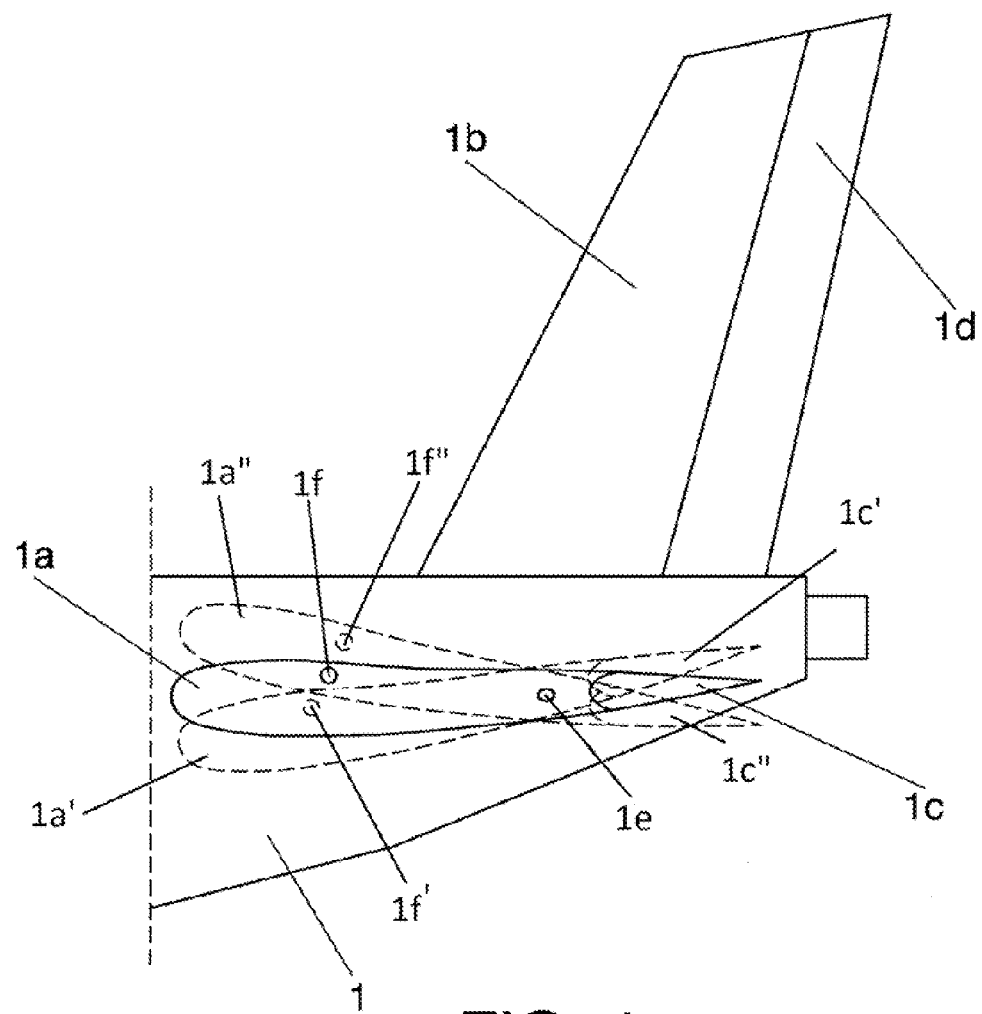
FIG. 1 is a schematic view in lateral elevation of the tail fuselage and of the empennage of an aircraft.
Figure 2:
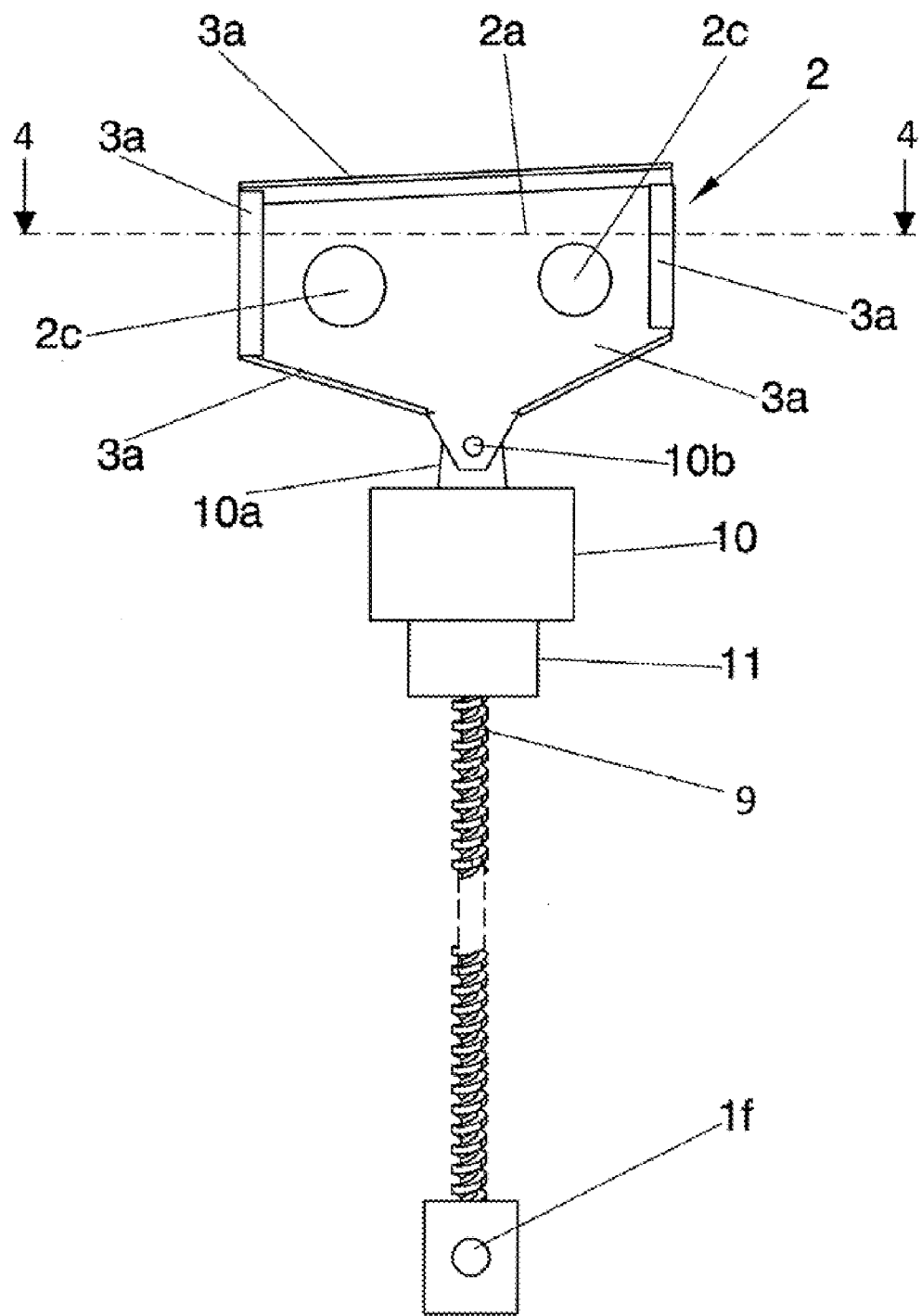
FIG. 2 is a schematic view in side elevation of an embodiment of the fitting with torsion box coupled to a motor/spindle unit.
Figure 3:
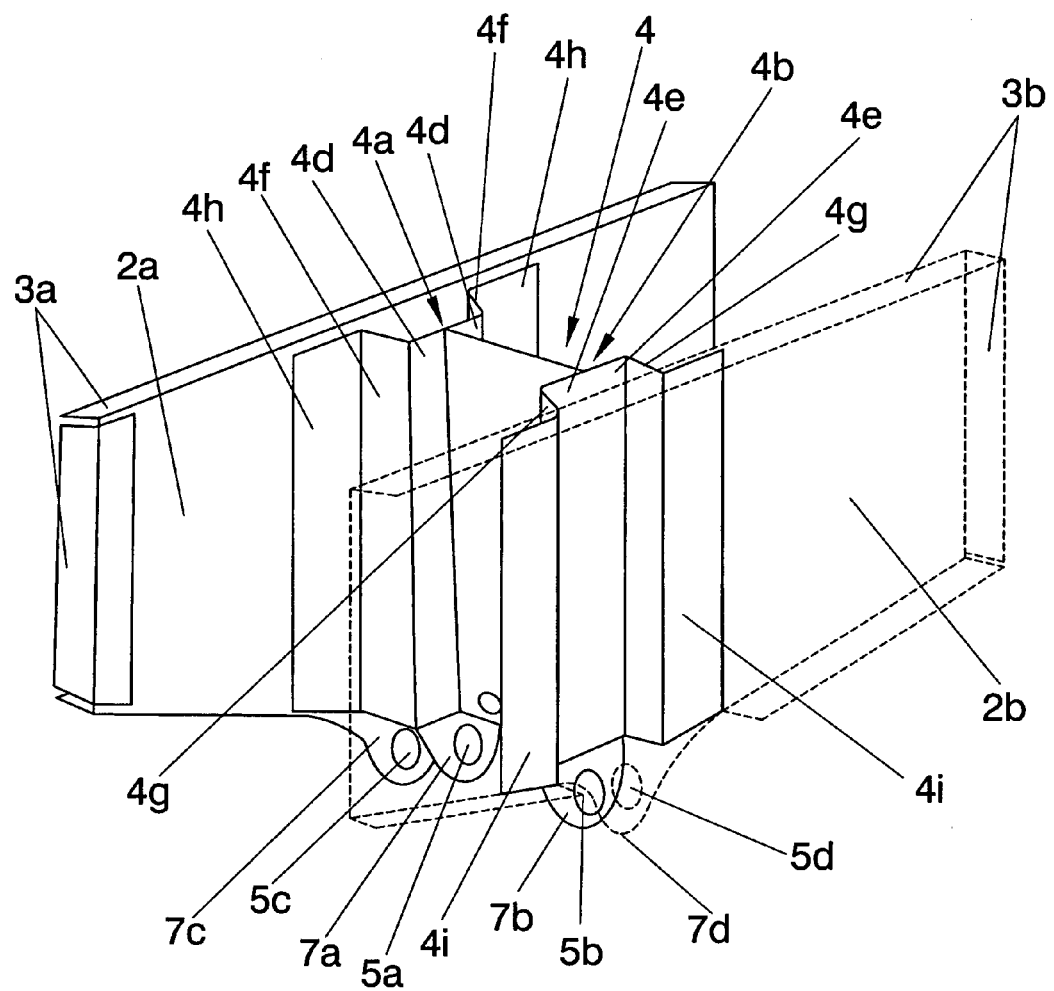
FIG. 3 is a schematic view in front perspective, in partial cross-section, of the fitting with torsion box shown in FIG. 2.
Figure 4:
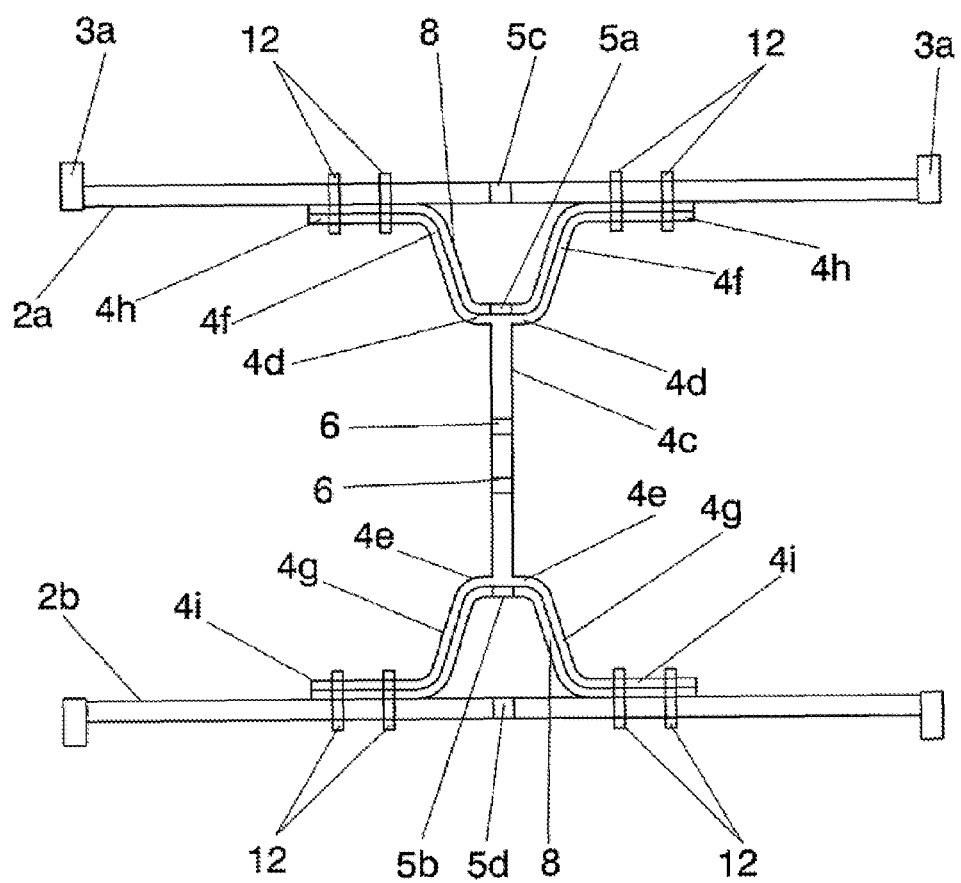
FIG. 4 is a schematic view in cross-section along the line 4-4' shown in FIG. 2.
Figure 5:
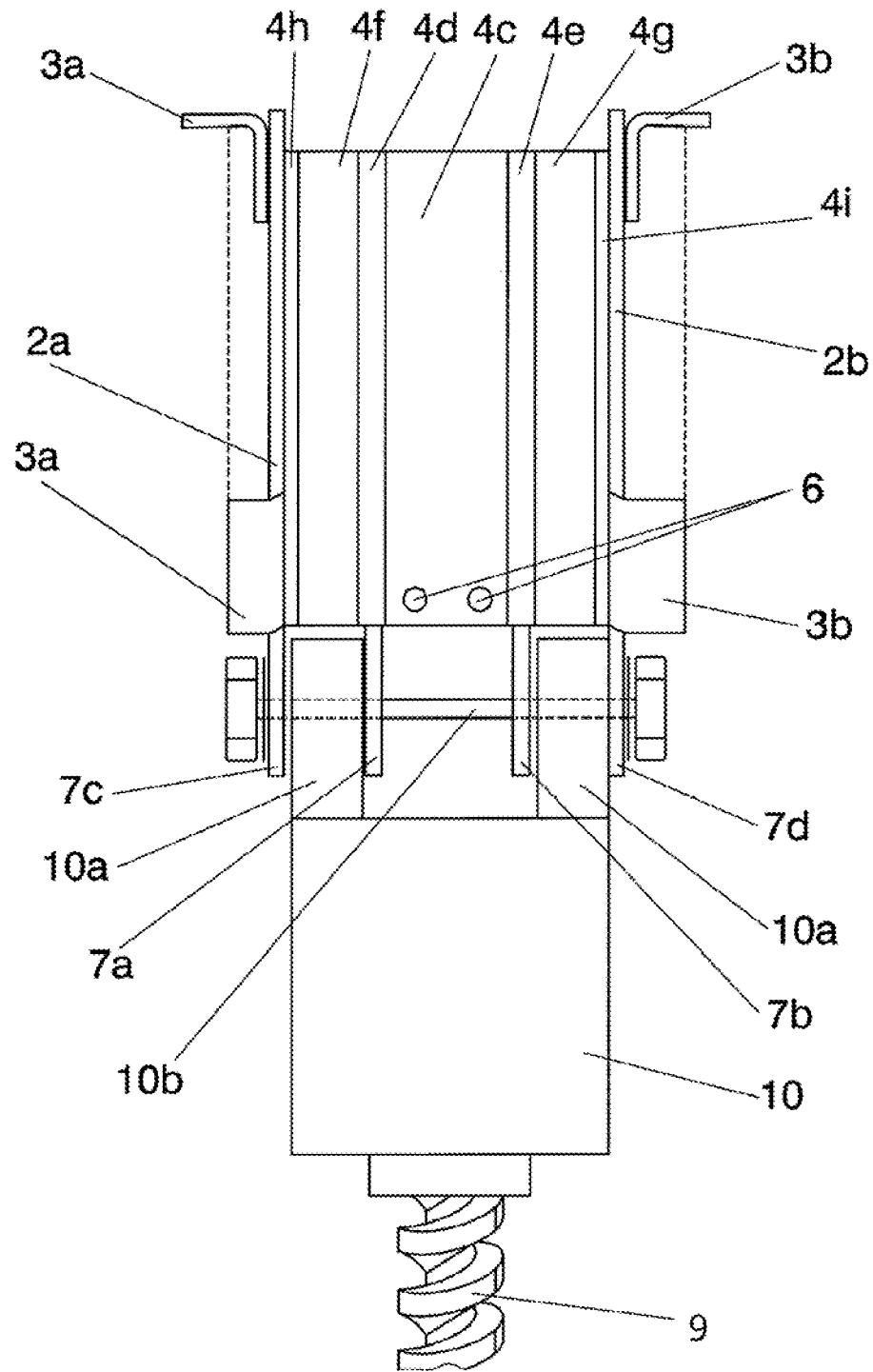
FIG. 5 is a schematic view from the front, in partial cross-section, of the fitting with torsion box shown in FIG. 2.

Appearing in these figures are numerical references identifying the following elements:

1 tail fuselage of the aircraft
1a horizontal stabilizer
1b vertical stabilizer
1c elevator
1d rudder
1e pivoting point of the horizontal stabilizer
1f fastening point of the horizontal stabilizer
2 torsion box
2a first side wall
2b second side wall
2c stiffening holes
3a first means of attachment
3b second means of attachment
4 stiffening element
4a first end part
4b second end part
4c central part
4d, 4e first sections
4f, 4g second sections
4h, 4i third sections
5a, 5b first primary passage holes
5c, 5d second primary passage holes
6 secondary passage hole
7a, 7b first primary lugs
7c, 7d second primary lugs
8 additional laminated material
9 spindle
10 motor
10a fastening lug for motor
10b pin
11 swivel
11a fastening lug for swivel
11b pin
12 rivet

MODES OF EMBODIMENT OF THE INVENTION

FIG. 1 shows the tail fuselage 1 of a aircraft in which is arranged a horizontal stabilizer 1a, with its elevator 1c, and also a vertical stabilizer 1b with its rudder 1d. The horizontal stabilizer 1a is trimmable in a way that is conventional in itself by means of a motor/spindle mechanism connected to a fastening point 1f, the actuation of which causes the stabilizer to pivot about the pivoting point 1e, so that, in a way that is also conventional in itself, the horizontal stabilizer 1a, the elevator 1c and the fastening point if can adopt the positions shown with the references 1a', 1c' and 1a and 1c", and 1f', 1f", respectively. Evidently, on the opposite side of the fuselage, not shown in FIG. 1, there is a right horizontal stabilizer with the elevator, analogous to the left horizontal stabilizer shown in FIG. 1.

FIGS. 2 to 5 show an embodiment of the invention in which the torsion box 2 comprises a first side wall 2a and first means of attachment 3a in the form of brackets via which the first side wall 2a can be riveted to a first frame (not shown in the figures) of the tail fuselage of the aircraft, and a second side wall 2b and second means of attachment 3b, also in the form of brackets, via which the second side wall 2b can be riveted to a second frame of the tail fuselage 1. The side walls 2a, 2b of the torsion box 2 are attached together by means of a stiffening element 4 arranged between those side walls 2a, 2b. On each side of the stiffening element, each wall 2a, 2b presents individual stiffening holes intended to prevent buckling of those side walls 2a, 2b. The stiffening element 4 comprises a first end part 4a attached to the first side wall 2a of the torsion box, a second end part 4b attached to the second side wall 2b of the torsion box, and a central part 4c which joins those end parts 4a, 4b. The torsion box 2 and the stiffening element 4 are shaped from a plastic material reinforced with carbon fiber.

Each end part 4a, 4b of the stiffening element 4 includes individual first sections 4d, 4e, which are extended in parallel to the side walls 2a, 2b to both sides of said central part 4c, individual second sections 4f, 4g which are respectively extended from one of the first sections 4d, 4e to the corresponding side wall 2a, 2b, and individual third sections 4h, 4i each one backing onto and attached to the side wall 2a, 2b. It can be seen that the sections 4d, 4f, 4h and 4e, 4g, 4i which respectively shape the first end part 4a and the second end part 4b of the stiffening element have a joint transverse section in the form of an omega and on these sections 4d, 4e, 4f, 4g, 4h, 4i of each end part 4a, 4b of the stiffening element 4 there is an additional laminated layer 8 arranged which presents a transverse section in the form of an omega similar to that of the said sections. This layer 8 can be obtained by means of an additional laminate in such a way that it shapes a single piece with the rest of the stiffening element 8. The respective third sections 4h, 4i and the corresponding parts of the additional laminated materials respectively arranged on these third sections are attached to the corresponding side wall 2a, 2b by means of rivets 12. In turn, the central part 4c of the stiffening element 8 comprises a reinforced zone with two secondary passage holes 6 which shape the secondary fastening for the fitting.

The first sections 4d of the first end part 4a of the stiffening element 4 and the first sections 4e of the second end part 4b of the stiffening element 4 include individual first primary passage holes 5a, 5b while the side walls 2a, 2b of the torsion box comprise individual second primary passage holes 5c, 5d. These primary passage holes 5a, 5c, 5b, 5d are aligned and respectively located in the primary lugs 7a, 7b, 7c, 7d emerging from the respective lower edges of the first sections 4d, 4e of the stiffening element and from the respective lower edges of the walls 2a, 2b in order to receive pin 10b and create the primary fastening for complementary lugs 10a of the motor 10 which drives the spindle 9. The lugs 7a, 7b, 7c, 7d are reinforced with a hybrid titanium-CFRP laminate, conventional in itself.

The invention claimed is:

1. Fitting with torsion box for coupling a motor/spindle unit for trimming of a horizontal stabilizer of an aircraft, which comprises
    a duplicated primary fastening for the pivoting coupling of a motor/spindle unit, and a secondary fastening;
    wherein
    the torsion box comprises a first side wall and first means of attachment for attaching the first side wall to a first frame of the tail fuselage of the aircraft, and a second side wall and second means of attachment for attaching the second side wall to a second frame of the tail fuselage;
    the side walls of the torsion box are attached together by a stiffening element arranged between those side walls;
    the stiffening element comprises a first end part attached to the first side wall, a second end part attached to the second side wall and a central part which joins those end parts;
    each end part comprises individual first sections, which are extended in parallel to the side walls to both sides of said central part, individual second sections which are respectively extended from one of the first sections towards the corresponding side wall, and individual third sections each one backing onto and attached to the side wall;
    the first sections of the first end part of the stiffening element and the first sections of the second end part of the stiffening element include individual first primary passage holes and the side walls of the torsion box comprise individual second primary passage holes, said primary passage holes being aligned in order to shape the primary fastening;
    the secondary fastening is at least one secondary passage hole in the central wall of the stiffening element;
    the torsion box and the stiffening element are shaped from plastic material reinforced with carbon fiber.

2. Fitting according to claim 1, wherein the first primary passage holes are arranged in individual reinforced zones of the first sections of the end parts of the stiffening element.

3. Fitting according to claim 2, wherein the first primary passage holes are arranged in individual first primary lugs which emerge from respective edges of the first sections of the end parts of the stiffening element.

4. Fitting according to claim 2, wherein the sections of each end part of the stiffening element include an additional laminated layer and in that the first primary passage holes are arranged in individual first primary lugs which emerge from respective edges of the laminated layer in the first sections of the end parts of the stiffening element.

5. Fitting according to claim 2, wherein the second primary passage holes are arranged in individual reinforced zones of the side walls of the torsion box.

6. Fining according to claim 2, wherein the second primary passage holes are arranged in individual second primary lugs which emerge from respective edges of the side walls of the torsion box.

7. Fitting according to claim 2, wherein each secondary passage hole is arranged in a reinforced zone of the central part of the stiffening element.

8. Fitting according to claim 2, wherein the third sections of the stiffening element are attached to the respective side wall of the torsion box by means of gluing.

9. Fitting according to claim 2, wherein the third sections of the stiffening element are attached to the respective side wall of the torsion box by means of riveting.

10. Fitting according to claim 2, wherein the stiffening element and torsion box are a monobloc piece.

11. Fitting according to claim 1, wherein the first primary passage holes are arranged in individual first primary lugs which emerge from respective edges of the first sections of the end parts of the stiffening element.

12. Fining according to claim 1, wherein the sections of each end part of the stiffening element include an additional laminated layer and in that the first primary passage holes are arranged in individual first primary lugs which emerge from respective edges of the laminated layer in the first sections of the end parts of the stiffening element.

13. Fitting according to claim 12, wherein the additional laminated material is a layer attached to said sections by lamination.

14. Fitting according to claim 1, wherein the second primary passage holes are arranged in individual reinforced zones of the side walls of the torsion box.

15. Fitting according to claim 1, wherein the second primary passage holes are arranged in individual second primary lugs which emerge from respective edges of the side walls of the torsion box.

16. Fitting according to claim 1, wherein each secondary passage hole is arranged in a reinforced zone of the central part of the stiffening element.

17. Fitting according to claim 1, wherein the third sections of the stiffening element are attached to the respective side wall of the torsion box by means of gluing.

18. Fitting according to claim 1, wherein the third sections of the stiffening element are attached to the respective side wall of the torsion box by means of riveting.

19. Fining according to claim 1, wherein the stiffening element and torsion box are a monobloc piece.

* * * * *